(12) United States Patent
Menjak

(10) Patent No.: US 6,892,605 B2
(45) Date of Patent: May 17, 2005

(54) HAND WHEEL ACTUATOR HAVING STATIONARY HUB

(75) Inventor: Ratko Menjak, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 31 days.

(21) Appl. No.: 10/091,079

(22) Filed: Mar. 4, 2002

(65) Prior Publication Data

US 2003/0164060 A1 Sep. 4, 2003

(51) Int. Cl.$^7$ .......................... F16H 35/00; B62D 5/04; B62D 5/06
(52) U.S. Cl. .................. 74/552; 180/402; 180/444; 74/388 PS
(58) Field of Search ............................. 74/552, 388 PS; 180/444, 405, 406, 407, 443, 402; B62D 5/04

(56) References Cited

U.S. PATENT DOCUMENTS

| | | | |
|---|---|---|---|
| 4,674,352 A | | 6/1987 | Mizuno et al. |
| 4,715,463 A | * | 12/1987 | Shimizu ..................... 180/446 |
| 4,771,846 A | | 9/1988 | Venable et al. |
| 4,825,972 A | * | 5/1989 | Shimizu ..................... 180/444 |
| 6,176,341 B1 | | 1/2001 | Ansari ........................ 180/402 |
| 6,394,218 B1 | * | 5/2002 | Heitzer ....................... 180/402 |
| 6,419,043 B1 | * | 7/2002 | Duval et al. ................ 180/444 |
| 6,488,115 B1 | * | 12/2002 | Ozsoylu et al. ............ 180/444 |
| 6,548,969 B2 | | 4/2003 | Ewbank et al. |
| 6,588,540 B2 | | 7/2003 | Graber et al. |
| 6,644,432 B1 | * | 11/2003 | Yost et al. .................. 180/444 |
| 2002/0189888 A1 | * | 12/2002 | Magnus et al. ............. 180/402 |
| 2003/0127276 A1 | * | 7/2003 | Shimizu et al. ............ 180/443 |
| 2003/0146037 A1 | * | 8/2003 | Menjak et al. ............. 180/402 |
| 2003/0188918 A1 | * | 10/2003 | Shimizu et al. ............ 180/444 |
| 2003/0192734 A1 | * | 10/2003 | Bugosh ...................... 180/444 |

FOREIGN PATENT DOCUMENTS

| CA | 1318833 | 6/1993 |
|---|---|---|
| DE | 100 20 085 | 7/2001 |
| DE | 100 20 085 C1 | 7/2001 |
| DE | 100 36 281 | 2/2002 |
| DE | 100 36 281 A1 | 2/2002 |
| EP | 0 857 638 A2 | 8/1998 |
| EP | 0 931 711 | 7/1999 |
| JP | 63-43846 | 2/1988 |

OTHER PUBLICATIONS

European Search Report and the Annex dated Oct. 14, 2003, (3 pages) for EP 03 07 5462.6.
English Abstract of JP2000355278 dated Dec. 26, 2000.

* cited by examiner

*Primary Examiner*—Vinh T. Luong
(74) *Attorney, Agent, or Firm*—Michael D. Smith

(57) ABSTRACT

A hand wheel actuator having a stationary hub is provided by a housing supporting a first shaft via bearings such that it is rotatable about its own axis. The first shaft has an upper end configured for attaching a hand wheel. The actuator also includes a position sensor for detecting an angular displacement of the first shaft from a selected origin and producing a signal indicative of the angular displacement and an electric motor in operative communication with the first shaft for providing feedback to a driver. A steering post is maintained in a fixed position with respect to the housing for maintaining the hub in a fixed position centrally of the hand wheel, so that the hub faces the driver when the hand wheel is operated. The steering post extends along an axis of rotation of the hand wheel and through the first shaft, which is fixed to the hand wheel and rotates therewith.

29 Claims, 6 Drawing Sheets

HAND WHEEL ACTUATOR HAVING STATIONARY HUB

TECHNICAL FIELD

This disclosure relates to a hand wheel actuator for a steer-by-wire system of an vehicle. More particularly, the disclosure relates to a hand wheel actuator having a stationary hub.

BACKGROUND

Automobiles are conventionally equipped with a pair of front road wheels that are steered to enable the vehicle to turn left and right as it maneuvers on land. It is also known to provide actuators for steering rear wheels in automobiles. Vehicle steering systems commonly employ a mechanical connection between the driver-operated hand wheel and the front road wheels of an automotive vehicle. As the driver rotates the hand wheel, a mechanical linkage through the vehicle's tie-rods actuate the road wheels sometimes with the assistance of a power assist steering motor or hydraulic piston. The term, "hand wheel" as used herein refers to a driver-operated rotating steering input device, but it need not be round or wheel shaped, though that is the most common configuration.

Recently, steer-by-wire steering systems have been introduced into automotive vehicles to provide road wheel steering function. Included in a typical steer-by-wire steering system is a hand wheel actuator for monitoring the angular position of the steering wheel, and road wheel motor actuators, which are controlled by controllers in response to tracking the sensed angular displacement of the hand wheel from a central or other position. In contrast to prior steering systems, the steer-by-wire steering system does not employ a mechanical linkage between the steering wheel and the individual road wheels. Exemplary of such known steer-by-wire systems is commonly-assigned U.S. Pat. No. 6,176,341, issued Jan. 23, 2001 to Ansari, which is incorporated herein by reference in its entirety.

Along with the advent of steer-by-wire systems, automobile purchasers are always expecting an increased level of driver comfort and convenience. The desirability of placing some instruments, such as environmental and audio system controls on or near the steering wheel has long been recognized. Such controls are currently placed in various locations around the steering wheel, such as along a spoke or integrated in a multi-function stalk switch. As the sophistication of automobile electronics increases, and with the increased popularity of such systems as mobile communications, Global Positioning Satellite (GPS) systems and electronic maps, the locations available to place such controls and displays are not adequate, particularly since any control or display mounted on the hub or spoke of the steering wheel (over the airbag, for example) would turn with the steering wheel and therefore not be useful unless traveling in a relatively straight line.

Accordingly, there is perceived a need for a steering wheel assembly having a stationary hub so that electronic controls and displays are viewable and conveniently provided.

SUMMARY

The above-discussed and other drawbacks and deficiencies of the prior art are overcome or alleviated by providing a hand wheel actuator having a stationary hub, including a housing supporting a first shaft via bearings such that it is rotatable about its own axis. The first shaft has an upper end configured for attaching a hand wheel. The actuator also includes a position sensor for detecting an angular displacement of the first shaft from a selected origin and producing a signal indicative of said angular displacement and an electric motor in operative communication with the first shaft for providing feedback to a driver. A steering post is maintained in a fixed position with respect to the housing for maintaining the hub in a fixed position centrally of said hand wheel, so that the hub faces the driver when said hand wheel is operated. The steering post extends along an axis of rotation of the hand wheel and through the first shaft, which is fixed to the hand wheel and rotates therewith.

The above-discussed and other features and advantages of the present invention will be appreciated and understood by those skilled in the art from the following detailed description and drawings.

BRIEF DESCRIPTION OF THE DRAWINGS

The present invention will now be described by way of example with reference to the accompanying drawings, in which:

FIG. 4 shows a third embodiment of a hand wheel actuator having a stationary hub;

DETAILED DESCRIPTION OF THE PREFERRED EMBODIMENTS

Figure 1:
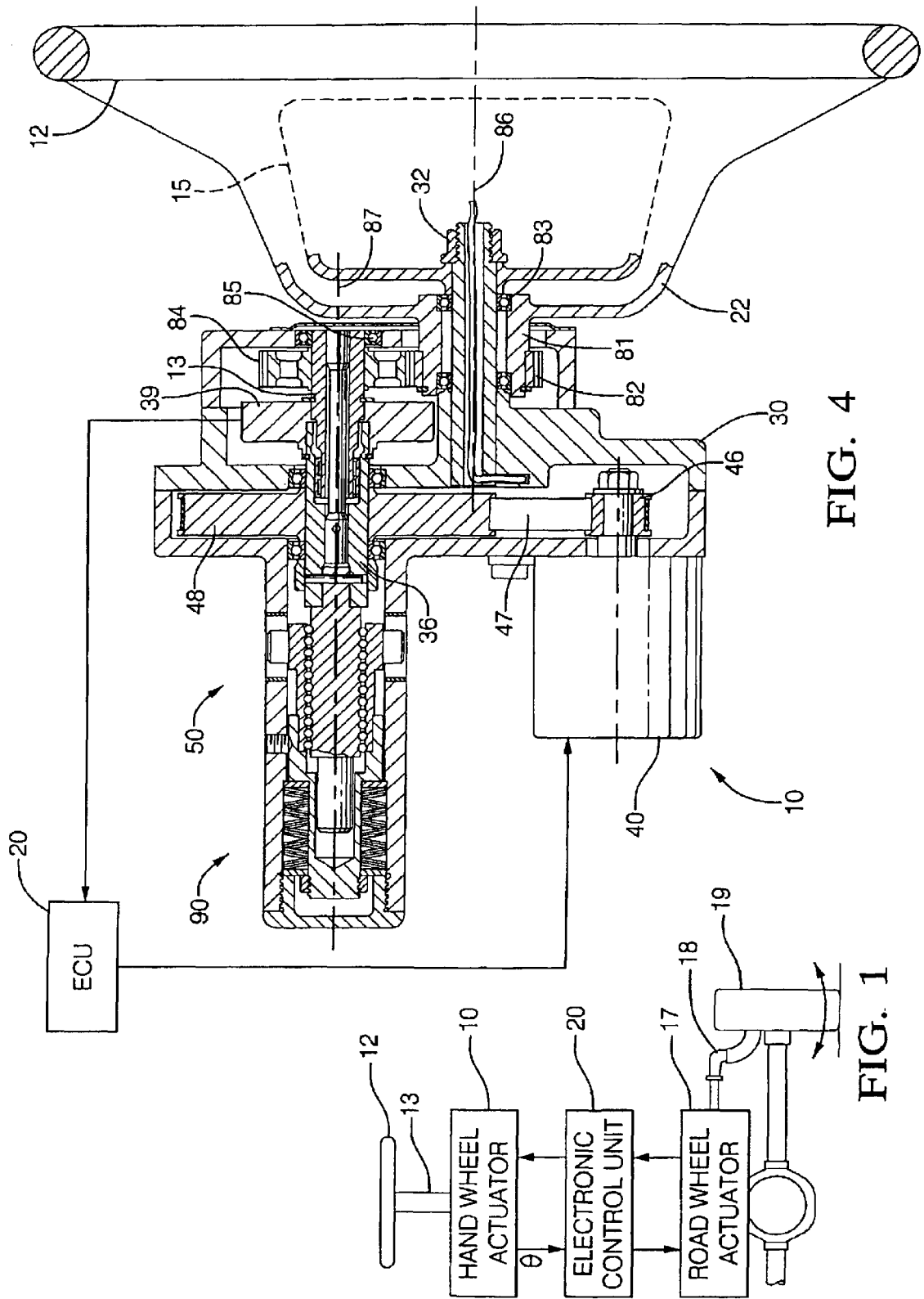
FIG. 1 shows a schematic overview of a steer-by-wire system.

FIG. 1 shows a schematic overview of an exemplary steer-by-wire system for a vehicle. Driver input is made to hand wheel 12, which is connected by upper shaft 13 to hand wheel actuator 10. Hand wheel actuator 10 includes a position sensor for detecting the angular displacement of hand wheel 12. The position sensor output is directed to electronic control unit 20, which includes a microprocessor and other assorted electronic components well known in the field of electronic control for providing memory, input/output, and processing functions. Electronic control unit 20 receives signals from hand wheel position sensors in hand wheel actuator 10 and determines what signals, if any, to send to road wheel actuator 17 so that the position of road wheels 19 (only one shown) properly correspond with the position of hand wheel 12. Road wheel actuator 17 controls the steering position of road wheels 19 by means of a tie-rod 18.

Road wheel actuator 17 includes torque or strain sensors to measure force required by road wheel actuator 17 to rotate and maintain road wheels 19 in their desired position. Output from road wheel torque sensors (not shown) is transmitted to electronic control unit 20, which then transmits driver feedback information to hand wheel actuator 10. Hand wheel actuator 10 includes an electric motor or other actuator to provide force-feedback to steering wheel 12, thus giving the driver feedback as to the road conditions. Hand wheel actuator 10 may also include a torque sensor for providing a signal to the electronic control unit to ensure that the driver is receiving the correct amount of driver feedback.

Figure 2:
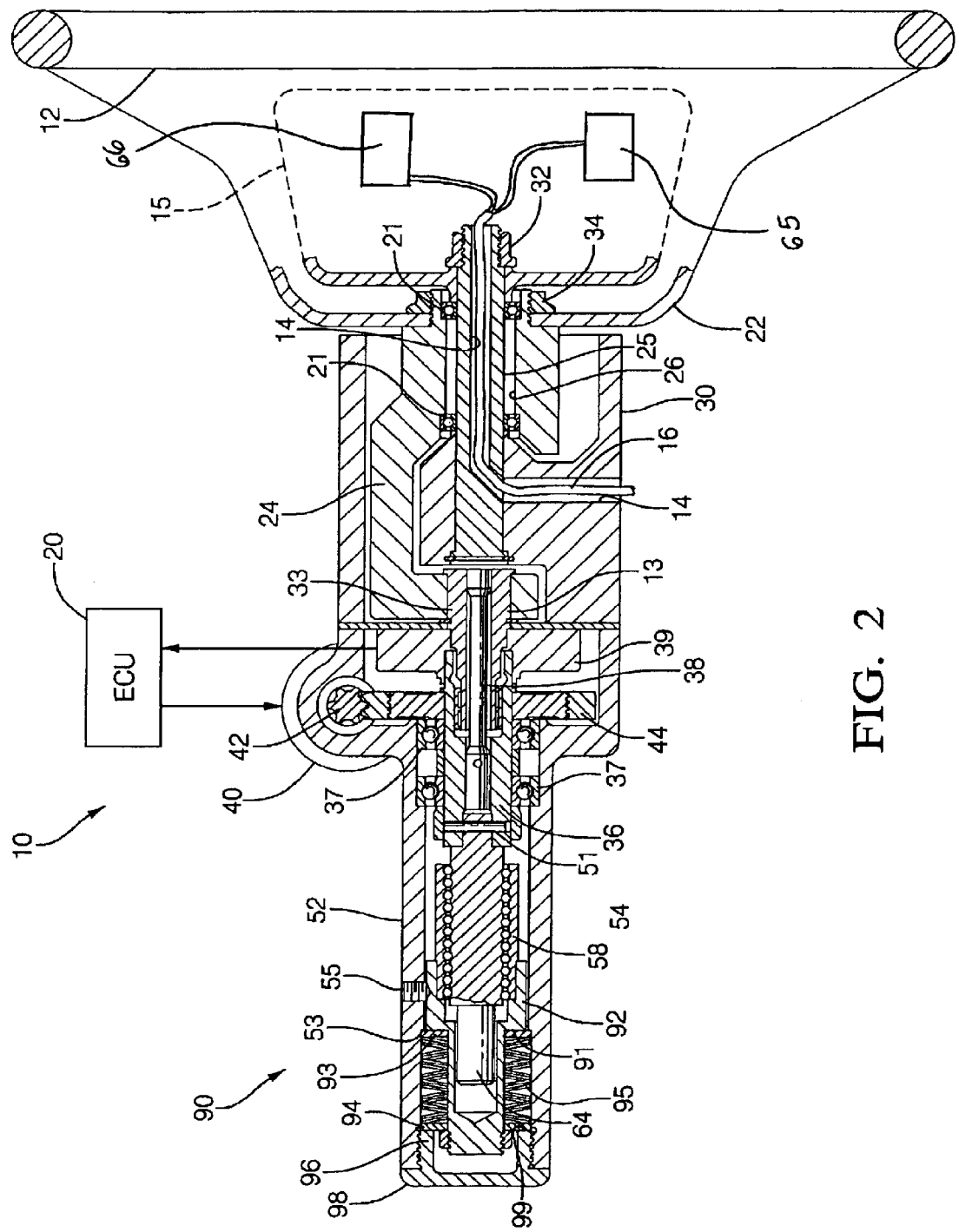
FIG. 2 shows a first embodiment of a hand wheel actuator having a stationary hub.

FIG. 2 shows a first embodiment of a hand wheel actuator having a stationary hub. Hand wheel 12 is rigidly connected via one or more spokes 22 to arm 24 via first shaft 71 integrally formed therewith. While first shaft 71 and arm 24 are shown as being integrally formed, they may of course be constructed from separate components. First shaft 71 includes a central opening 26 through which post 25 extends, and serves to transmit force from hand wheel 12 to upper shaft 13 via arm 24. Post 25 is fixed to actuator housing 30, supports stationary hub 15 at one end thereof, the hub being fixed by nut 32. Instrument cable 16 extends from hub 15 through channel 14 to additional electronics positioned behind the dashboard (not shown). The instrument cable may be in operable communication with electronic instruments 65 and switches 66 located within the hub 15.

As noted previously, arm 24 transmits force exerted on hand wheel 12 to upper shaft 13. Upper shaft 13 contains a torsion bar 38. Upper shaft 13 and torsion bar 38 are fixed with respect to each other at a first end 33 of upper shaft 13. At a lower end, torsion bar 38 is fixed to lower shaft 36. Upper shaft 13 and lower shaft 36 together make up steering shaft 55. Torque/position sensor 39 detects the displacement between upper shaft 13 and lower shaft 36 caused by torquing of torsion bar 38 and translates this into toque information. Torque/position sensor 39 also determines a displacement angle of upper shaft 13 and/or lower shaft 36 to indicate position. The torque and angular displacement signals are transmitted to electronic control unit (ECU) 20. ECU 20 receives the torque and angular displacement signals, as well as other signals such as, for example, vehicular speed and sensors at road wheels 19 (FIG. 1, only one shown) and outputs driving signals for road wheel steering actuator 17 (FIG. 1). ECU also uses feedback from one or more torque sensors in road wheel actuator 17 to calculate the necessary driver feedback torque. This calculation is translated into a motor input signal that is provided to motor 40. Motor 40 imparts a torque against lower shaft 36 via worm 42 mounted or formed into the output shaft of motor 40, and worm gear 44, which is fixed to lower shaft 36. Note that torque/position sensor provides torque feedback to ECU 20 for closed-loop control of driver feedback.

Hand wheel actuator 10 includes a spring-biased mechanical return-to-center device 90. With this device, rotational motion of lower shaft 36 is transmitted to ball screw 54 via pin 51. As ball screw 54 rotates, ball nut 58 is permitted only to slide longitudinally. Spring adapter 92 is fixed to ball nut 58, telescoping over ball screw extension 64.

Compression spring 95 is constrained between spring washers 93 and 94. Spring washer 93 is limited from moving right as seen in FIG. 2 by either shoulder 91 of spring adapter 92 or shoulder 53 of housing 52. Spring washer 94 is limited from moving left as seen in FIG. 2 by either nut 96 attached to end of spring adapter 92 or lip 99 of cover 98. When ball nut 58 moves to the right from the center position shown in FIG. 2, nut 96 and spring washer 94 move with it, while spring washer 93 remains fixed against shoulder 53 of housing 52. The spring compresses causing increased resistance the farther ball nut 58 is moved from center. On the other hand, when ball nut 58 moves left from the central position shown in FIG. 2, spring washer 93 is pushed to the left by shoulder 91 of spring adapter 92 while spring washer 94 remains fixed against lip 99 of cover 98. The spring again compresses, causing increased resistance the farther ball nut 58 is moved from center. A mechanical return-to-center device 90 will bias the steering wheel towards the center position at all times. A ball plunger 55 may also be employed for improving driver feel at center. Ball plunger 55 cams against the outer surface of spring adapter 92, which is shaped for a desirable center-feel.

With the embodiment shown in FIG. 2, rotational motion of hand wheel 12 is limited to less than 180° from center in either direction by housing 30, which supports post 25. Although so limited, arm 24 provides a low cost, reliable, and effective connection between the hand wheel 12 and upper shaft 13, while permitting hub 15 as well as electronics cables 16 to remain stationary. Furthermore, arm 24 provides a solid connection between hand wheel 12 and upper shaft 13, which reduces turning resistance and improves overall driver feel.

Figure 3:
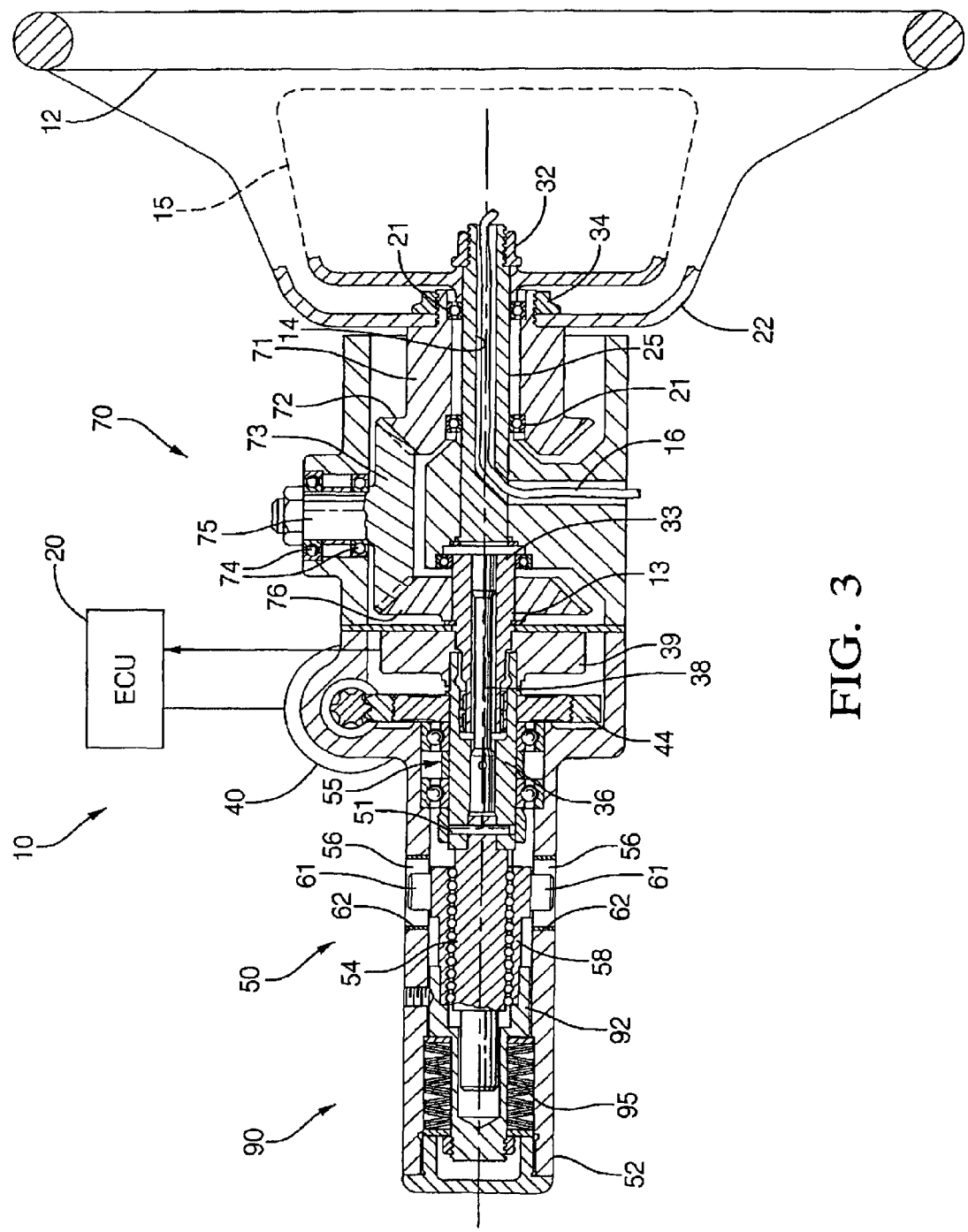
FIG. 3 shows a second embodiment of a hand wheel actuator having a stationary hub.

FIG. 3 shows a second embodiment. In this embodiment, as in the remaining embodiments to be described below, a hand wheel actuators including a fixed hub is configured such that the hand wheel is permitted to rotate in excess of 180° in either direction, e.g., they can provide a steering wheel rotation of ±540° rotation (i.e., one and one-half revolution in either direction) as in traditional mechanical steering systems. In this embodiment, hand wheel 12 is fixed to first shaft 71, which includes conical gear 72. Conical gear 72 is fixed to first shaft 71 or formed integrally therewith, as shown. Conical gear 72 engages second conical gear 73, which is fixed to spindle 75 and supported by bearings 74. While conical gear 72 and second conical gear 73 are arranged about 90 degrees with respect to each other, this is not a requirement, and other angles are possible. If a different angle is employed, the axis of upper shaft 13 may be angularly displaced, or some gear reduction may occur between first shaft 71 and upper shaft 13.

Second conical gear 73 engages third conical gear 76, which is fixed to upper shaft 13. The remaining apparatus is structurally and functionally similar to the first embodiment previously described. However, since housing 30 does not limit rotation of hand wheel 12, stopper 50 is provided to limit rotation. Stopper 50 operates as a positive travel end stop and comprises ball screw 54 connected to lower shaft 36 by pin 51. Ball nut 58 engages ball screw 54 and travels linearly along the axis of ball screw 54. Rotation of ball nut 58 is prevented by bosses 61, which slide in slots 56 formed in housing 52. Bumpers 62 are optionally provided in slots 56 to provide rapidly increased resistance at the positive travel limits, thereby improving steering feel.

In operation, hand wheel rotates first shaft 71 which rotates conical gear 72. Conical gear 72, second conical gear 73, and third conical gear 76 are arranged series so that when conical gear 71 rotates in a first direction, conical gear 76 will rotate in an opposite direction around the common axis. Note that there is no requirement that the hand wheel axis and upper shaft axis be coincident. Using different sized gears or varying relative angles between them can customize the configuration of the actuator to any specific application.

Upper shaft 13, torsion bar 38, lower shaft 36, torsion/position sensor 39, electronic control unit 20, worm gear 44, pin 51, ball screw 54, ball nut 58 and return-to-center device 90 all operate as described above with respect to the first embodiment shown in FIG. 2. As ball nut 58 slides to the left and right as seen in FIG. 3, it engages bumpers 62 positioned at either end of slots 56, thereby limiting the linear movement of ball nut 58. When ball nut 58 reaches one limit of movement, it prevents further rotation of ball screw 54, which prevents further rotation of lower shaft 36, upper shaft 13, third conical gear 76, second conical gear 73, conical gear 72, first shaft 71 and therefore hand wheel 12. Preferably, slots 56 are sized to permit a maximum rotation of 540° (one and a half revolutions) from center in either direction.

FIG. 4 shows a third embodiment. Differences between the second and third embodiments will be described. In this embodiment, spokes 22 of hand wheel 12 are integrally formed with shaft 81, which is supported by bearings 83. First gear 82 is fixed to shaft 81 and engages second gear 84, which is fixed to upper shaft 13. As can be seen, steering axis 86 and axis 87 of upper shaft 13 are parallel but not coincident. Motor 40 engages lower shaft 36 by means of a motor pulley 46, belt 47, and lower shaft pulley 48. This pulley/belt configuration has the advantage of quieter operation and no possibility of backlash resulting from worm 42 and worm gear 44 of previous embodiments, and therefore has the potential for improved performance. In other respects the third and second embodiment are structurally and functionally similar.

Figure 5:
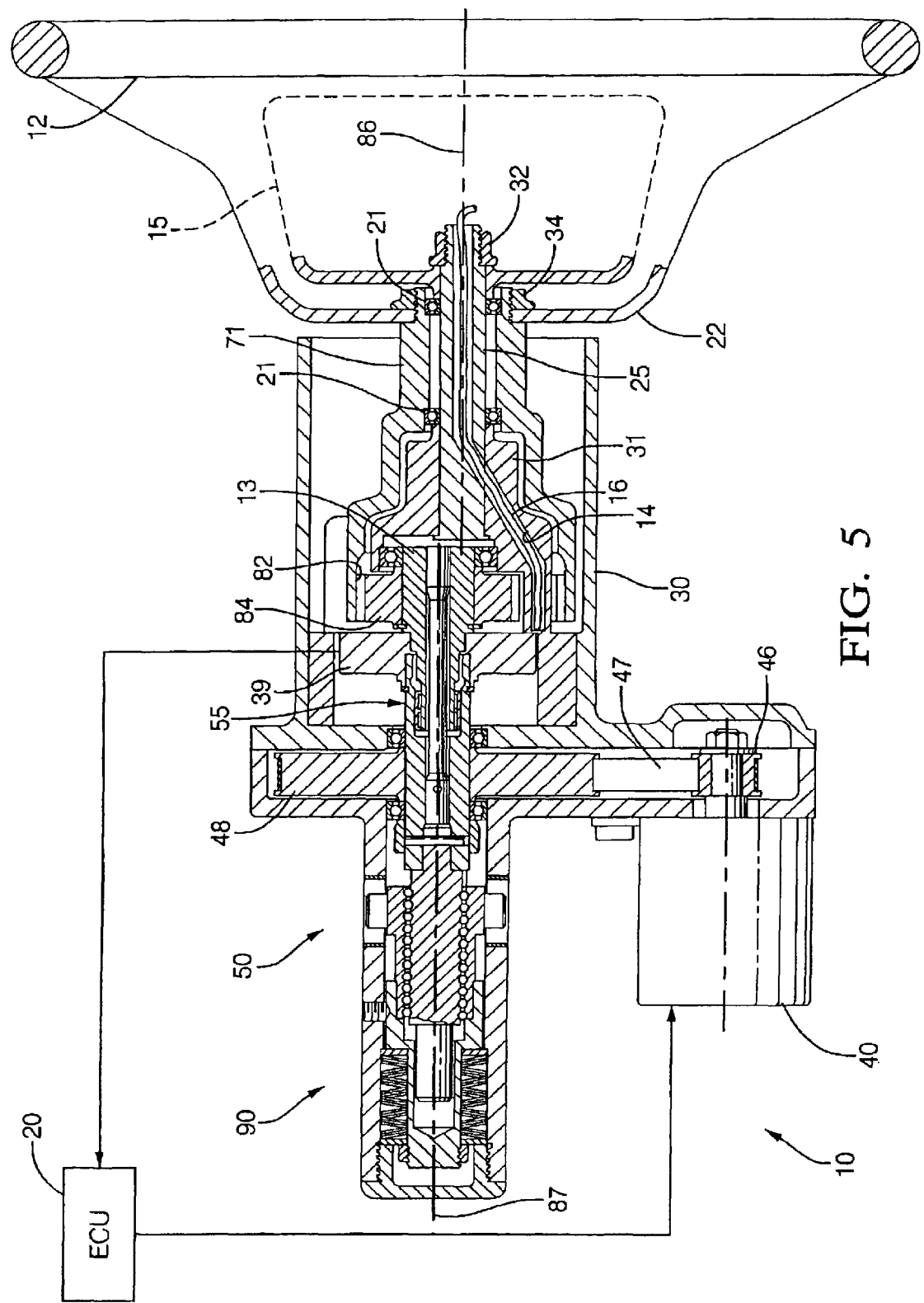
FIG. 5 shows a fourth embodiment of a hand wheel actuator having a stationary hub.

FIG. 5 shows a fourth embodiment which is similar to the third embodiment shown in FIG. 4, with the exception that first gear 82 is an inside gear formed inside first shaft 71. First gear 82 engages second gear 84 which is fixed to upper shaft 13.

Because of second gear 84 is somewhat smaller than first gear 82, steering axis 86 is just offset from axis 87 of upper shaft 13. Post support 31, which is fixed to housing 30, extends through the gap between first gear 82 and second gear 84 to fixedly support post 25 and thereby maintain hub 15 in a stationary position. Post support 31 also supports bearings 21 which rotatably support first shaft 71. Instrument cable 16 passes from hub 15 through post 25, through post support 31, and then to any associated electronic components (not shown). In all other respects the fourth embodiment is structurally and functionally similar to the previous embodiment.

Figure 6:
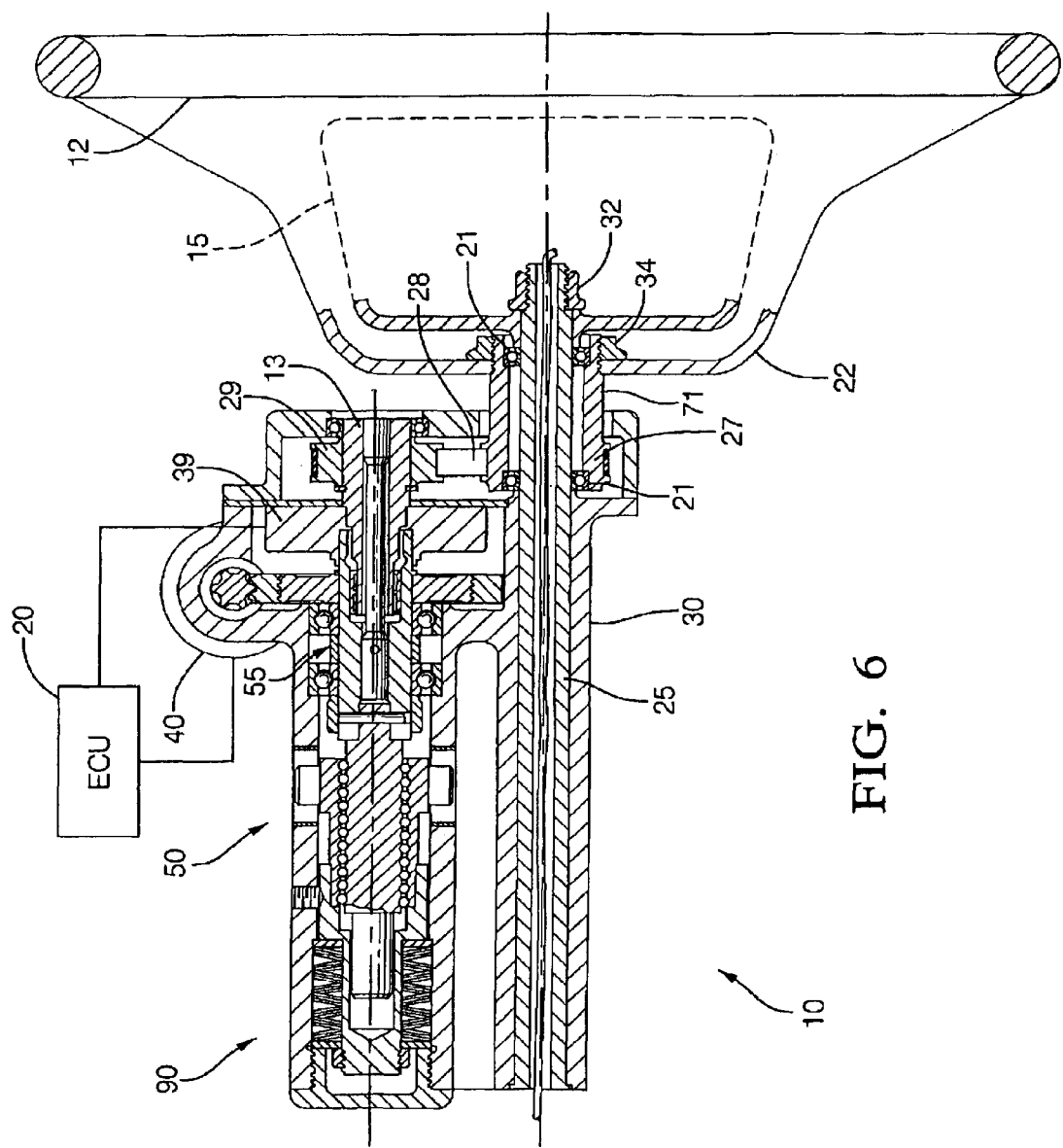
FIG. 6 shows a fifth embodiment of a hand wheel actuator having a stationary hub.

FIG. 6 shows a fifth embodiment of the invention. In this embodiment, hand wheel 12 is mounted to a first shaft 71, which is supported by bearings 21 over post 25, and a steering pulley 27 is formed into or attached to first shaft 71. A steering belt 28 engages steering pulley 27 and upper shaft pulley 29 so that motion and force is transmitted from first shaft 71 to upper shaft 13. This pulley/belt configuration has the advantage of quieter operation and no possibility of backlash resulting from gear interactions of previous embodiments, and therefore has the potential for improved performance. In other respects, the fifth embodiment is similar to the first and second embodiments.

Figure 7:
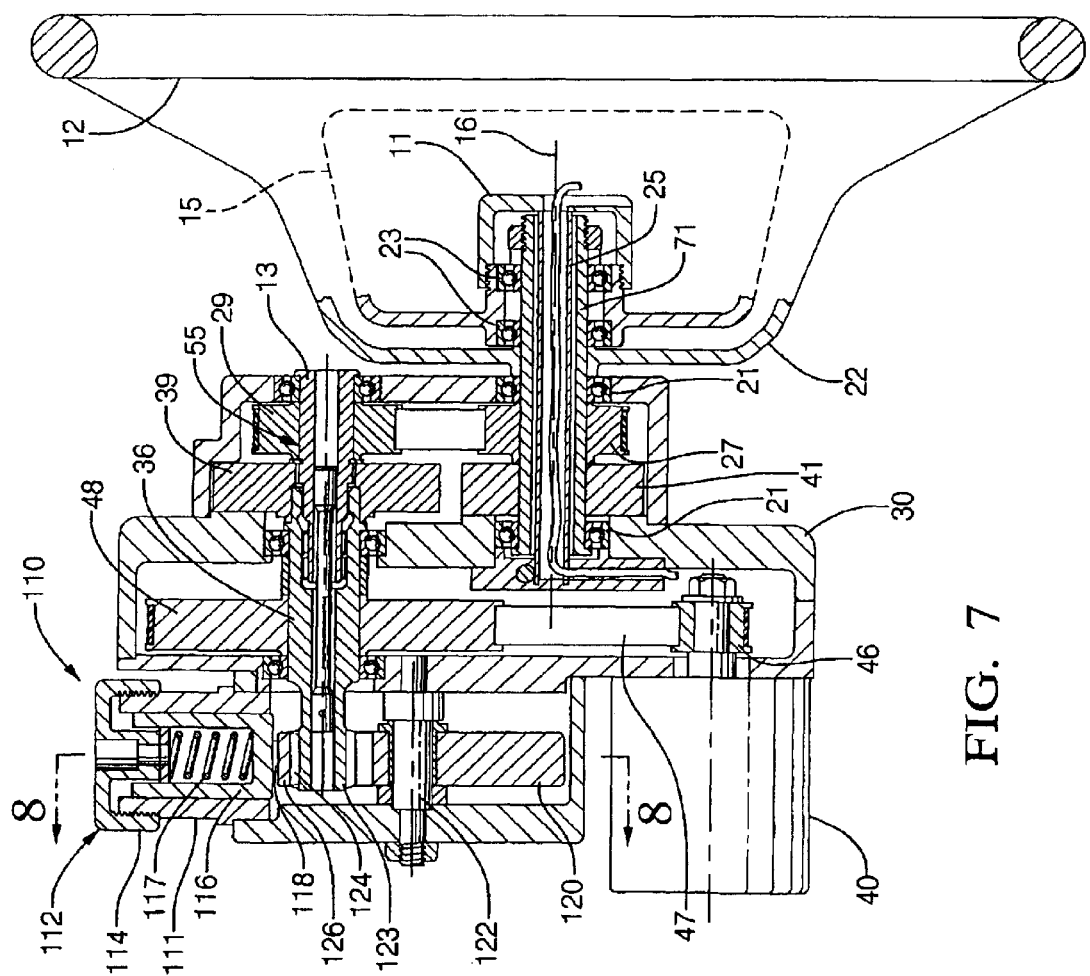
FIG. 7 shows a sixth embodiment of a hand wheel actuator having a stationary hub.

FIG. 7 shows a sixth embodiment of the invention. In this embodiment, rather than post 25 providing support for shaft 71 as in previous embodiments, shaft 71 is supported by bearings which are directly supported by housing 30, and hub 15 is supported by shaft 71 via bearings 23. Post 25 extends through shaft 71 and serves only as a conduit for instrument cable 16 and to maintain hub 15 in a fixed position, i.e., prevent hub 15 from rotating with shaft 71.

Shaft 71 includes a steering pulley 27 mounted thereon which, along with pulley 29 on upper shaft 13 and steering belt 28, provide a means for placing first shaft 71 and upper shaft 13 into operable communication with each other. Other means, such as those described herein with respect to previous embodiments can easily be used in place of steering belt 28. This embodiment includes torque/position sensor 39 and redundant position sensor 41 that directly measures the position of first shaft 71.

Figure 8:
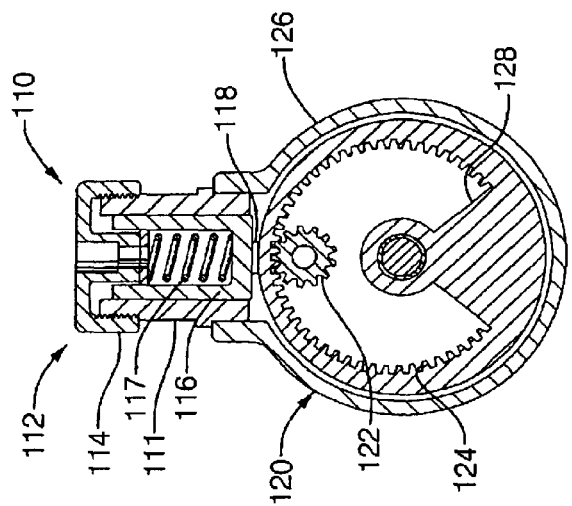
FIG. 8 shows a schematic view of a return-to-center device of FIG. 7.

Return-to-center device 110, shown in FIG. 7 and schematically in FIG. 8, includes a cam gear 120 mounted to an pin 122, which is positioned parallel to lower shaft 36. Lower shaft 36 includes a pinion 122 that interfaces with internal gear teeth 124. Cam gear 120 includes a camming surface 126.

A cam follower 112 is fixed to housing 30 and positioned to engage camming surface 126. Cam follower 112 comprises a housing 111 that is generally cylindrically shaped and containing spring 117. Spring 117 is in compression and biases cam 116 towards camming surface 126. Cam 116 includes a bearing surface 118 formed from a low friction material such as an acetal resin. An adjustable cam stop 114 is threaded to housing 111 on a side opposite said cam to adjust the compression force exerted by spring 117.

Cam surface 126 is represented in FIG. 8 as circular that has a center displaced from the center of rotation defined by pin 122. However, the cam may have other shapes corresponding to an optimized return-to center feel for the driver.

Cam gear 120 includes stop surfaces 128 to prevent cam gear 120 from rotating past a selected point, thereby also providing an absolute stop function as discussed above with respect to the second embodiment shown in FIG. 3.

As used herein, the terms, "first", "second", "third", etc., are used only to distinguish among various similar elements and not to designate an order in terms of position or importance.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A hand wheel actuator comprising:
    a housing;
    a first shaft having an upper end configured for attaching a hand wheel, said first shaft being supported by said housing via bearings such that said first shaft is rotatable about its own axis;
    a position sensor for detecting an angular displacement of the first shaft from a selected origin and producing a signal indicative of said angular displacement;
    an electric motor in operative communication with the first shaft for providing force feedback to a driver; and
    a steering post maintained in a rotationally fixed position with respect to the housing for maintaining a hub in a rotationally fixed position centrally of said hand wheel, said hub facing the driver when said hand wheel is operated, said steering post extending along an axis of rotation of said hand wheel and through said first shaft, said first shaft being fixed to said hand wheel and rotating therewith.

2. The hand wheel actuator of claim 1, said hub including electronic instruments and switches, said post being hollow and serving as a conduit for an instrument cable extending to said instruments and switches.

3. The hand wheel actuator of claim 1, said steering post being attached and fixed directly to said housing.

4. The hand wheel actuator of claim 3 wherein said first shaft includes a lower section having an increased diameter and an internal gear, said internal gear being engaged to a pinion mounted to an upper shaft; said post support extending between said internal gear and said pinion for supporting and maintaining said post in a fixed position with respect to said housing.

5. The hand wheel actuator of claim 1, said steering post being attached directly to a post support which is fixed to said housing.

6. The hand wheel actuator of claim 1, said first shaft being supported by said steering post via said bearings which allow relative rotation between said steering post and said first shaft.

7. The hand wheel actuator of claim 6 further comprising: an arm extending from said first shaft to a steering shaft, said steering shaft and said first shaft being coaxial and said arm being fixed and connecting said steering shaft with said first shaft; said position sensor directly sensing a position of said steering shaft.

8. The hand wheel actuator of claim 6, further comprising an arm extending from said first shaft to a steering shaft, said steering shaft and said first shaft being coaxial and said arm being fixed and connecting said steering shaft with said first shaft and wherein said steering shaft comprises an upper shaft and a lower shaft, said upper shaft and said lower shaft being coupled by a torsion bar and said position sensor is a torque/position sensor, said torque/position sensor utilizing a displacement between said upper shaft and said lower shaft to determine a torque on said steering shaft, said motor being operatively connected to said lower shaft.

9. The hand wheel actuator of claim 6, further comprising:
an arm extending from said first shaft to a steering shaft, said steering shaft and said first shaft being coaxial and said arm being fixed and connecting said steering shaft with said first shaft; and
a return-to-center device operatively connected to said steering shaft, said return-to-center device applying a mechanical force to said steering shaft when said hand wheel is not in a centered position, said mechanical force biasing said hand wheel toward said centered position.

10. The hand wheel actuator of claim 6, said first shaft being in mechanical communication with a steering shaft, said position sensor directly sensing a position of the steering shaft.

11. The hand wheel actuator of claim 10 wherein said first shaft has a first gear and said steering shaft has a second gear, said first gear and said second gear being in operative communication with each other such that rotation of one of said first gear and said second gear causes a corresponding rotation of another of said first gear and said second gear.

12. The hand wheel actuator of claim 11 wherein said first gear is a conical gear and said second gear is a conical gear.

13. The hand wheel actuator of claim 12 wherein said first gear and said second gear have substantially coincident axes of rotation.

14. The hand wheel actuator of claim 11 wherein said first gear and said second gear engage each other and have parallel axes of rotation.

15. The hand wheel actuator of claim 10 wherein said first shaft has a first pulley and said steering shaft has a second pulley, said hand wheel actuator further comprising a belt that engages said first pulley and said second pulley thereby placing said steering shaft and said first shaft in operative communication with each other.

16. The hand wheel actuator of claim 10 wherein said steering shaft comprises an upper shaft and a lower shaft, said upper shaft and said lower shaft being coupled by a torsion bar and said position sensor is a torque/position sensor, said torque/position sensor utilizing a displacement between said upper shaft and said lower shaft to determine a torque on said steering shaft, said motor being operatively connected to said lower shaft.

17. The hand wheel actuator of claim 16 further comprising a redundant position sensor directly sensing a position of said first shaft.

18. The hand wheel actuator of claim 10 further comprising a mechanical return-to-center and positive stop device that positively limits rotation of said hand wheel to a selected maximum angle or rotation in either direction and provides a mechanical force to said steering shaft when said hand wheel is not in a centered position, said mechanical force biasing said hand wheel toward said centered position.

19. The hand wheel actuator of claim 18 wherein said mechanical return-to-center and positive stop device acts directly on said steering shaft.

20. The hand wheel actuator of claim 18 wherein said mechanical return-to-center and positive stop device comprises a ball screw and spring mechanism.

21. The hand wheel actuator of claim 18 wherein said mechanical return-to-center and positive stop device comprises a spring-biased cam and camming surface linked to said steering shaft.

22. The hand wheel actuator of claim 1 wherein said first shaft is supported by said housing via said bearings which allow rotation of the first shaft with respect to said housing; said post extending through said first shaft to maintain said hub in said fixed position.

23. The hand wheel actuator of claim 1, said first shaft being in mechanical communication with a steering shaft, said position sensor directly sensing a position of the steering shaft.

24. The hand wheel actuator of claim 23 wherein said first shaft has a first pulley and said steering shaft has a second pulley, said hand wheel actuator further comprising a belt that engages said first pulley and said second pulley thereby placing said steering shaft and said first shaft in operative communication with each other.

25. The hand wheel actuator of claim 24 further comprising a redundant position sensor directly sensing a position of said first shaft.

26. The hand wheel actuator of claim 10 wherein said steering shaft comprises an upper shaft and a lower shaft, said upper shaft and said lower shaft being coupled by a torsion bar; said position sensor being a torque/position sensor that utilizes a displacement between said upper shaft and said lower shaft to determine a torque on said steering shaft, said motor being operatively connected to said lower shaft.

27. The hand wheel actuator of claim 23 further comprising a redundant position sensor directly sensing a position of said first shaft.

28. The hand wheel actuator of claim 23 further comprising a mechanical return-to-center and positive stop device that positively limits rotation of said hand wheel to a selected maximum angle or rotation in either direction and provides a mechanical force to said steering shaft when said hand wheel is not in a centered position, said mechanical force biasing said hand wheel toward said centered position.

29. The hand wheel actuator of claim 18 wherein said mechanical return-to-center and positive stop device comprises a spring-biased cam and camming surface linked to said steering shaft.

* * * * *